United States Patent
Ohmayer

(10) Patent No.: US 9,222,823 B2
(45) Date of Patent: Dec. 29, 2015

(54) OSCILLATING DEVICE FOR A FILL-LEVEL MEASUREMENT SYSTEM AND A METHOD FOR ASSEMBLING THE SAME

(71) Applicant: VEGA GRIESHABER KG, Wolfach (DE)

(72) Inventor: Gerd Ohmayer, Haslach (DE)

(73) Assignee: VEGA GRIESHABER KG, Wolfach (DE)

( * ) Notice: Subject to any disclaimer, the term of this patent is extended or adjusted under 35 U.S.C. 154(b) by 435 days.

(21) Appl. No.: 13/793,845

(22) Filed: Mar. 11, 2013

(65) Prior Publication Data
US 2014/0096602 A1   Apr. 10, 2014

Related U.S. Application Data

(60) Provisional application No. 61/647,319, filed on May 15, 2012.

(30) Foreign Application Priority Data

Mar. 29, 2012   (DE) .................... 20 2012 003 185 U

(51) Int. Cl.
*H01L 41/09* (2006.01)
*G01F 23/28* (2006.01)
*G01F 23/296* (2006.01)

(52) U.S. Cl.
CPC ............ *G01F 23/28* (2013.01); *G01F 23/2961* (2013.01); *G01F 23/2968* (2013.01)

(58) Field of Classification Search
CPC ...................................... G10K 9/122
USPC .................... 310/324, 328, 348, 365
See application file for complete search history.

(56) References Cited

U.S. PATENT DOCUMENTS

| | | | | |
|---|---|---|---|---|
| 3,345,588 A | * | 10/1967 | Chesney | 333/191 |
| 4,228,379 A | * | 10/1980 | Guscott et al. | 310/322 |
| 4,496,871 A | | 1/1985 | Sumita et al. | |
| 4,754,440 A | | 6/1988 | Naruse | |
| 5,883,459 A | * | 3/1999 | Cline et al. | 310/339 |
| 6,047,603 A | * | 4/2000 | Ohtera et al. | 73/649 |
| 6,144,142 A | * | 11/2000 | Face et al. | 310/358 |
| 2004/0056612 A1 | | 3/2004 | Kuhny et al. | |
| 2011/0012480 A1 | * | 1/2011 | Turner | 310/346 |

FOREIGN PATENT DOCUMENTS

| | | |
|---|---|---|
| DE | 10 2004 033311 | 1/2006 |
| EP | 0 757 505 | 2/1997 |

(Continued)

OTHER PUBLICATIONS

German Appln. Patent Serial No. DE 10 2012 205 168.6 Office Action mailed Jan. 18, 2013, 4 pages—German, 1 page—English.

*Primary Examiner* — Thomas Dougherty
(74) *Attorney, Agent, or Firm* — Andrew F. Young, Esq.; Lackenbach Siegel, LLP

(57) ABSTRACT

An oscillating device for a fill-level measurement system includes a drive element in operative connection with a diaphragm. The drive housing receives the drive element at an open-ended front side and includes a first housing part and a second housing part in an operative axially interfitting arrangement proximate the drive element. A flexible conductor in operative connection joins the drive element and extends in a sung-fit arrangement between the first housing part and the second housing part providing improved operative performance.

12 Claims, 3 Drawing Sheets

(56) References Cited

FOREIGN PATENT DOCUMENTS

| | | |
|---|---|---|
| EP | DE10331566 | 3/2004 |
| JP | 11 027797 | 1/1999 |
| WO | WO 2005/001812 | 1/2005 |
| WO | WO 2009/110986 | 9/2009 |

* cited by examiner

OSCILLATING DEVICE FOR A FILL-LEVEL MEASUREMENT SYSTEM AND A METHOD FOR ASSEMBLING THE SAME

CROSS REFERENCE TO RELATED APPLICATIONS

This application relates to and claims priority from German App. Ser. No. 20 2012 003 185.6 filed Mar. 29, 2012 and U.S. Ser. No. 61/647,319 filed May 15, 2012, the entire contents of each of which are incorporated herein fully by reference.

FIGURE SELECTED FOR PUBLICATION

FIG. 2

BACKGROUND OF THE INVENTION

1. Field of the Invention

The present invention relates to an oscillating device for a fill-level measurement system and a method for assembling the same. More particularly, the present invention concerns an oscillating device for a fill-level measurement unit wherein a drive housing includes two or more operatively interfitting housing parts bounding a drive element and securing a connector thereto with increased reliability.

2. Description of the Related Art

Conventionally, in the known fill-level measurement techniques, so-called vibration resonators with piezoelectric drive systems are used to detect fluids, which as a rule exhibit a piezo-element for inducing mechanical oscillation, for example, an oscillating cradle diaphragm. It is known, for example, from the patent DE 10 260 088 A1, the entire contents of which are incorporated herein by reference, that such a piezo-element is glued onto the oscillating unit, thus, for example, to an oscillating cradle diaphragm as a drive element. Assembly time is reduced by means of such a gluing technique, and it eliminates expensive mechanical connection elements.

A typical oscillating device is, for example, known from DE 10 2007 038 022 A1, the entire contents of which are incorporated herein by reference, in which an oscillating mechanical unit which is attached as a oscillating cradle to a diaphragm, is displaced in mechanical oscillations by means of a piezoelement as a drive unit. This drive unit, together with an electronic unit, is combined in a housing to control and evaluate its sensor signals.

In order to avoid the penetration of fluid or humidity into the housing, this conventionally is partially cast with a grout but not the contact areas proper, in order to avoid the penetration of grouting material on the contact. A conductor, which is executed as a flexible conductor or flexible circuit board, produces the connection between the drive unit and a contact unit belonging to the electronic unit. In the grout-free space of the housing, temperature-conditioned effects of forces can act on the conductor, in which the motions of the conductor caused thereby are so affected by a guide element that damage is prevented to the conductor at the contact connections of the conductor.

The disadvantage of these conventional oscillating devices lies in the expensive and very numerous structural parts that prevent forces acting on an electrical conductor connecting the drive unit to the electronic unit from being transferred to its contact connections.

ASPECTS AND SUMMARY OF THE INVENTION

According to one aspect of the present invention, there is provided an oscillating device for a fill-level measurement system includes a drive element in operative connection with a diaphragm. The drive housing receives the drive element at an open-ended front side and includes a first housing part and a second housing part in an operative axially interfitting arrangement proximate the drive element. A flexible conductor in operative connection joins the drive element and extends in a sung-fit arrangement between the first housing part and the second housing part providing improved operative performance.

According to another aspect of the present invention, there is provided a method for assembling an oscillating device and for operatively securing a flexible conductor relative to the oscillating device.

It is a proposed task of the present invention to offer an oscillating device of the type cited at the beginning, with a simple construction resulting in low assembly complexity, in particular with a small number of structural parts, so that tensile forces that act on electrical conductors connected to a drive element of the oscillating device are not transferred to the contact connections of the conduct- or to the drive element.

Furthermore, it is a proposed second task of the present invention to offer a method for the assembly of the oscillating device according to the invention.

Regarding the first task, such a oscillating device for a fill-level measurement unit with a diaphragm which is displaceable in oscillation, a drive element of the diaphragm that is in operative connection with to the diaphragm, a hollow cylindrical drive housing for receiving the drive element at an open-ended front side of the drive housing, and a flexible electrical conductor connected to the drive element, is distinguished according to the invention in that the drive housing exhibits a first hollow cylindrical housing part, which encloses a second hollow cylindrical housing part concentrically and in an essentially flush-fit manner, in which the second housing part is construct-ed to be axially displaced, insertable into the first housing part, and the electrical conductor emerging from the drive element is disposed essentially clamped in the axial direction between the first and the second housing parts.

With this oscillating device according to the invention, a simple and function-consonant housing construction is set up for the drive housing receiving the drive element, preferably a piezo disk, which at the same time with the simple geometry of the housing parts concentric to one another achieves a clamping of the electrical conductor between the inner casing surface of the first housing part and the outer casing surface of the second housing part. By means of this clamping, the tensile forces acting on the electrical conductor are not transferred to the contact connections of the conductor with the drive element, preferably the piezo disk, but are absorbed by the drive housing.

In a preferred embodiment, it is provided that the conductor is connected to the drive element by developing a conductor end overhanging the drive element and the conductor end emerging from the drive element is disposed clamped essentially in an axial direction between the first and the second housing parts which also serves as a clamping means.

Thus, not only is the conductor held clamped between the two housing parts, but the conductor end overhanging the drive element, preferably the piezo disk, is also held clamped in the same way between the inner casing surface of the first housing part and the outer casing surface of the second housing part. Thus the drive element, prefer-ably the piezo disk, can be fixed flat at the open-ended front side of the housing at three essentially opposing points in the position provided, in particular when the conductor is guided diametrally through a circular drive element. Further features for connecting the drive element to the drive housing are thus not required.

For the secure clamping of the conductor or the conductor end, according to a preferred development of the invention, guide surfaces matching one another are provided at the inner casing surface of the first housing part and the outer casing surface of the second housing part for the clamped guidance of the conductor or of the conductor and conductor end. In order to achieve as high a force fit or friction fit as possible between the conductor or the conductor end and the two housing parts, it is preferably provided that the guide surfaces form a guide channel, whose cross-section essentially matches the cross-section of the conductor. With a flexible ribbon cable as an electrical conductor, these guide surfaces represent flat surfaces, between which a ribbon cable is clamped flush with the surface also as a means for securing or clamping.

In a further preferred development of the invention, the conductor or the conductor and conductor end are constructed with a detent in the area of the housing, which detent interacts and operatively interengages with a complementary detent of the drive housing, so that even high tensile forces at the conductor are also absorbed by the drive housing and thus do not stress the contact connections of the conductor with the drive element which thus provides a means for reducing contact connection stress and improving reliability.

Preferably, such detents are achieved in that an extension of the conductor or conductor end running in the area of the guide surfaces is provided as a detent such that it abuts a front edge of the second housing part facing away from the drive and overhanging the outer casing surface as a complementary detent. Such extensions can be achieved in a simple manner on a flexible conductor or a flexible circuit board as an electrical conductor. The overhanging edge at the second housing part, which edge serves as a complementary detent, simultaneously serves as a detent abutting the front side of the first housing part.

In order to ensure error-free assembly of the two housing parts, the first and the second housing parts are constructed according to a preferred embodiment of the invention with matching positioning elements, which, upon inserting the first housing part into the second housing part, orient the guide surfaces to one another.

To achieve a vibration resonator, it is offered that the drive element be constructed as a piezo disk, for example as a circular disk of a piezoelectric drive system. Preferably, at the same time, the diaphragm, displaceable in oscillation, is constructed as a cradle oscillator and is connected to the piezo disk by means of a shim, which for example can be constructed as a ceramic disk. The connection between the shim and the piezo disk on the one hand and a diaphragm on the other hand can be made by means of a glued connection.

The second task mentioned is resolved by means of a method for the assembly of an oscillating device for a fill-level measurement unit with the features of the proposed invention.

This method for the assembly of a oscillating device for a fill-level measurement unit with a diaphragm displaceable in oscillation, a drive element of the diaphragm which is in operative connection with the diaphragm, a hollow cylindrical drive housing for receiving the drive element at a open-ended front side of the drive housing, and a flexible electrical conductor connected to the drive element, in particular for the assembly of a oscillating device according to one of the preceding claims, is distinguished according to the invention in that the drive element with the conductor projecting radially at the front side of a first hollow cylindrical housing part of the drive housing is placed such that the conductor lies in an edge-wise groove of the housing wall of the first housing part and a second hollow cylindrical housing part of the drive housing is inserted into the first housing part by moving the drive element as far as the opposing front side of the first housing part and the simultaneous axial guidance of the conductor between the first and second housing parts, in which the second housing part is enclosed concentrically and essentially in a flush-fit manner by the first housing part.

With this method according to the invention, simple and rapid assembly of the drive housing is achieved, in which, at the same time as the assembly, tensile-stress relief of the electrical conductor connected to the drive element is achieved. The drive element preferably represents a piezo disk.

It is especially preferred according to one development of the invention if the conductor is connected to the drive element by developing a conductor end overhanging the drive element, in which the conductor end lies in a further edgewise groove of the housing wall of the first housing part and the conductor end, upon inserting the second housing parts into the first housing part, is guided emerging from the drive element in essentially an axial direction between the first and second housing parts.

In this embodiment of the invention, the assembly takes place in that the drive element is inserted, with the conductor overhanging on opposite sides of the drive element, into the two grooves provided for this for part of the proposed means and the drive element is, with the insertion of the second housing part into the first housing part, pressed into the inside of the first housing part as far as its opposite front side, whereby the conductor and the conductor end are shaped by adjusting to the two housing parts and are clamped between the two housing parts, but the drive element, preferably the piezo disk is also fixed thereby in a flush-fit manner to the front side of the second housing part in the position provided. Further connection means for connecting the drive element to the drive housing are thus not required.

It is adaptively preferred, according to a further embodiment of the invention, if the first and second housing parts with the groove or with the further groove are constructed in a complementary manner as aligned guide surfaces at the outer and inner casing surfaces, in which the conductor or the conductor and conductor end is or are guided by inserting the second housing part into the first housing part. The danger of incorrect assembly is thus reliably prevented.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
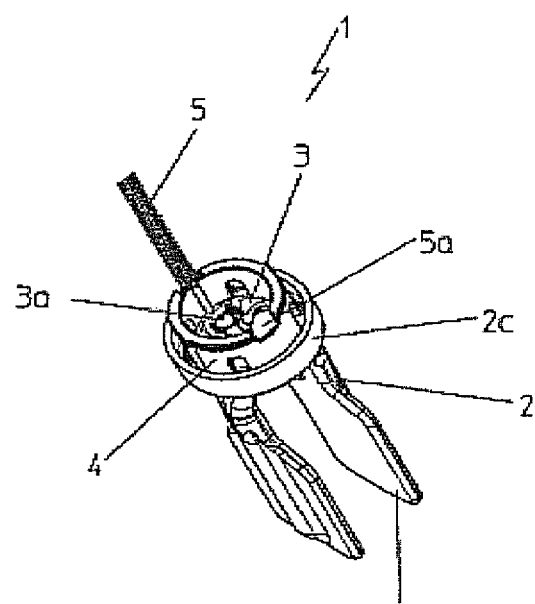
FIG. 1 is a perspective representation of an oscillating device as an embodiment example of the invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

The oscillating device 1 according to FIG. 1 for a fill-level measurement unit includes a drive housing 4 with a cradle oscillator 2, as well as a flexible circuit board or a flexible conductor as a conductor 5 with conductor channels 5*b*, which serve as a connection cable for connecting the oscillating device 1 to a data sensor (not depicted). This flexible conductor 5 is folded multiple times and can be unfolded by splitting webs in order thereby to increase its length. Such flexible conductors 5 are constructed on a base film, for example a polyamide film, on which the conductor channels 5*b* are disposed. A housing receiving this oscillating device 1 to form a data sensor is not depicted in this FIG. 1.

Figure 2:
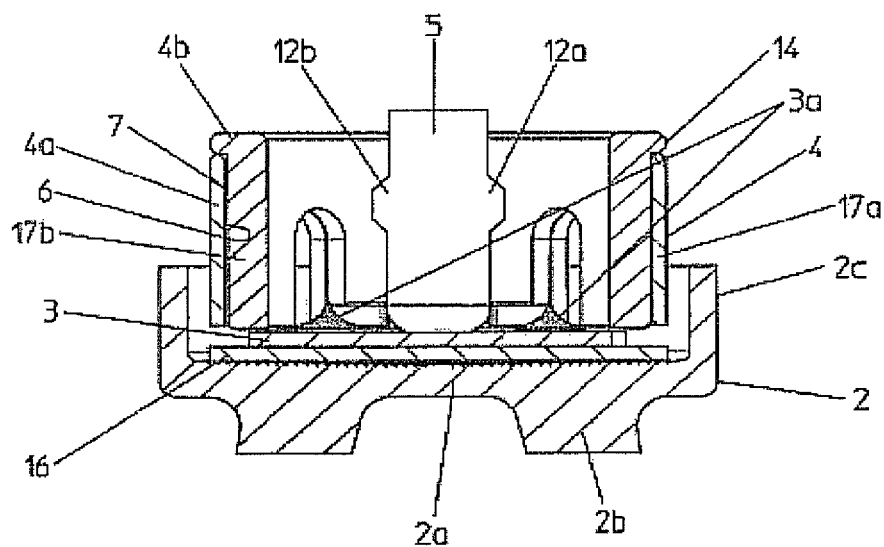
FIG. 2 is a partial section representation of the oscillating device according to FIG. 1.

The construction of the oscillating device 1 and of its drive housing 4 may be seen in the detail in the partial-section representation of FIG. 2.

Accordingly, the drive housing 4 is constructed as a hollow circular cylinder and consists of a first and second hollow cylindrical housing part 4*a* and 4*b*, in which the second hollow cylindrical housing part 4*b* is enclosed concentrically and in a flush-fit manner by the first housing part. As a result, these two housing parts 4*a* and 4*b* are adjusted to one another such that, for the assembly of the drive housing 4, the second housing part 4*b* can be inserted into the first housing part 4*a*, as can be seen from FIG. 4, that is, the second housing part 4*b* is constructed as axially displaceable, insertable into the first housing part 4*a*.

At an open front side of the drive housing 4, a piezo disk 3 is, according to FIG. 2, disposed as a drive element, which is connected by means of a shim 16 constructed as a ceramic disk to a diaphragm 2*a* of the cradle oscillator 2 by means of glued connections. The cradle oscillator 2 is made as a single piece from the diaphragm 2*a* and a cradle-shaped oscillating body 2*b*, in which the diaphragm 2*a* is bordered by an edge 2*c* running around it, which makes the connection with the housing (not depicted) of the fill-level measurement unit.

Figure 3:
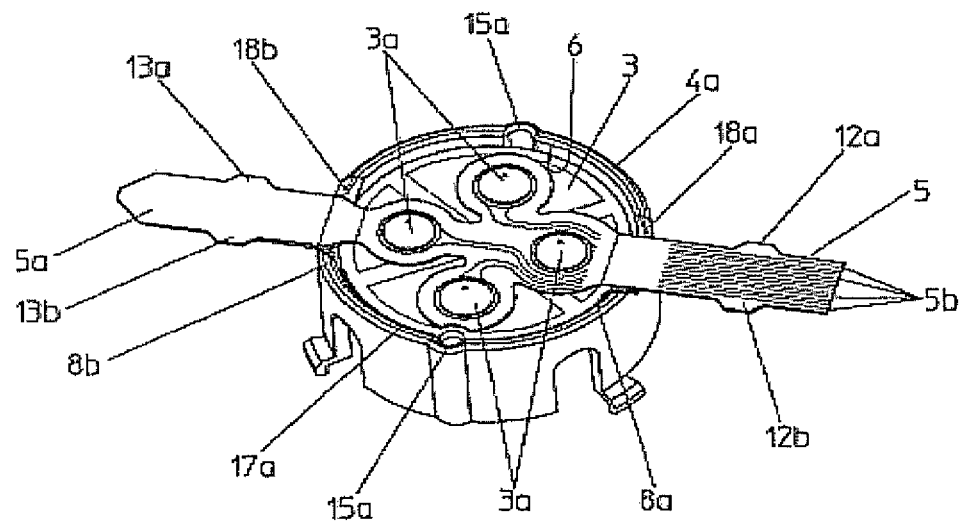
FIG. 3 is a perspective representation of a partially assembled drive housing.

The circular piezo disk 3 is depicted in FIG. 3 in plan view in an assembly layout as being inserted in the first housing element 4*a*. Accordingly, the flexible conductor 5 is guided with several conductor channels 5*b* diametrally through the piezo disk 3 and as a result is preferably connected electrically over four contact sites 3*a* to the piezo disk 3, in which these contacts can be constructed as solder points, weld spots, or conductor glued connections. The conductor end 5*a* which has passed out through the piezo disk 3 exhibits no conductor channels 5*b*; thus it consists only of the base film of the flexible conductor 5.

For the assembly of the drive housing 4, the piezo disk 3 together with the flexible conductor 5 is, as may be seen from FIG. 3, laid out at a front side of the first housing part 4*a* such that the flexible conductor 5, projecting radially from the piezo disk, as well as its conductor end 5*a* likewise projecting radially from the piezo disk 3, lie at one time in a groove 18*a* and a further groove 18*b* of the housing wall 17*a* of the first housing part 4*a*.

Figure 4:
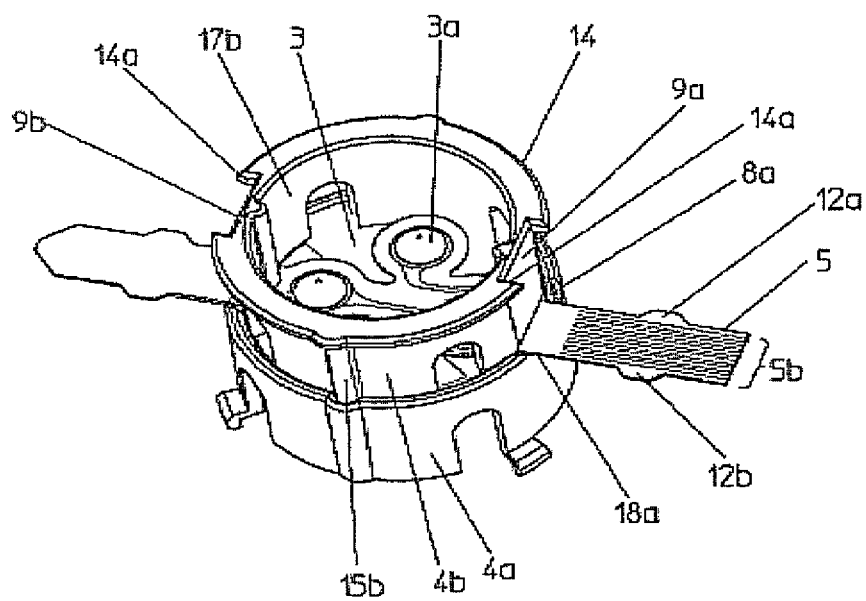
FIG. 4 is a further perspective representation of a partially assembled drive housing.
Figure 5:
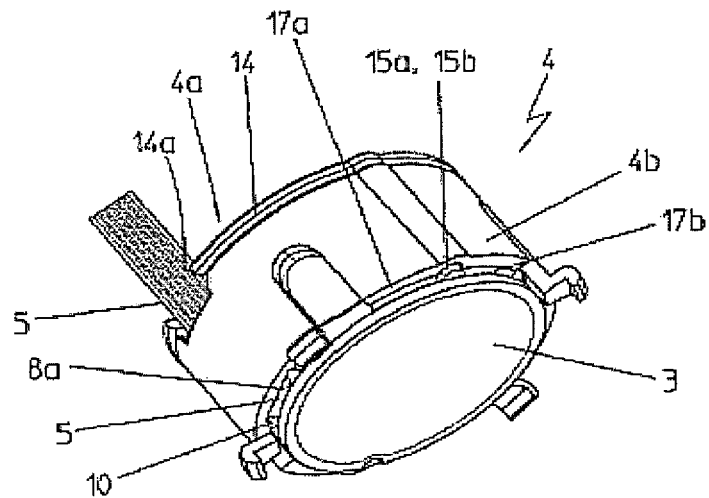
FIG. 5 is a perspective representation of a drive housing of the oscillating device according to FIG. 1.
Figure 6:
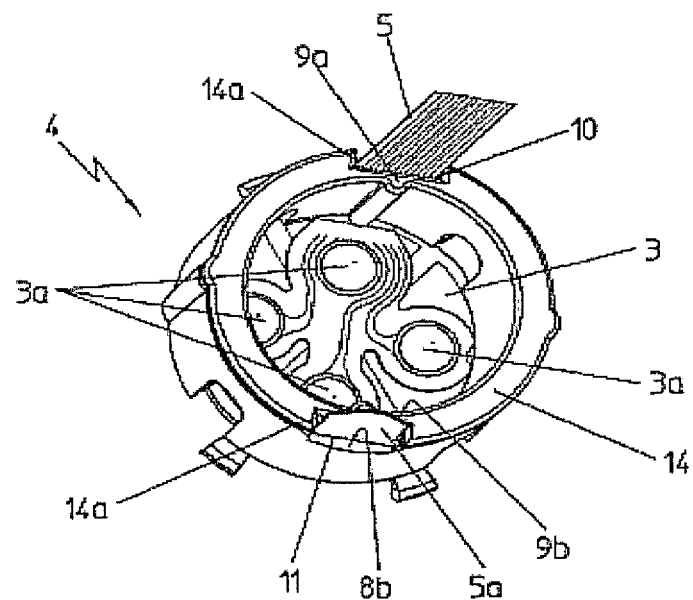
FIG. 6 is a further perspective representation of a drive housing according to FIG. 1.

Then, according to FIG. 4, the second housing part 4*b* is set on the piezo disk 3 and inserted into the first housing 4*a*, so that the piezo disk 3 is thereby moved through the first housing part 4*a* as far as its opposite front side and as a result, at the same time the flexible conductor 5 and its conductor end 5*a* are guided and shaped such that they adjust to the contour of the two housing parts 4*a* and 4*b* and so run in between the first and second housing parts 4*a* and 4*b*, that is, the flexible conductor 5 and its conductor end 5*a* are clamped between the inner casing surface 6 of the first housing part 4*a* and the outer casing surface 7 of the second housing part 4*b*, whereby when joining the two housing parts 4*a* and 4*b* as well as when operating, for example, during temperature cycling, tensile forces existing at the flexible conductor 5 and/or its conductor end 5*a* do not act on the piezo disk 3, but are taken up by the housing parts 4*a* and 4*b*. Due to these clamps, no lateral tensile forces affect the contact connection between the contact sites 3*a* and the flexible conductor 5 or its conductor end 5*a* either.

To guide the flexible conductor 5 and its conductor end 5*a*, guide surfaces 8*a* and 8*b* are formed at the inner casing surface 6 of the first housing part 4*a* and matching guide surfaces 9*a* and 9*b* at the outer casing surfaces 7 of the second housing part 4*b*, so that the flexible conductor 5 is guided in a guide channel 10 formed by the guide surfaces 8*a* and 9*a* and the guide surfaces 8*b* and 9*b* form a guide channel 11 for the conductor end 5*a*.

The second housing part 4*b* exhibits at the front side a stopping means constructed as an overhanging edge 14, which ends the insertion movement of the second housing part 4*b*, so that the piezo disk 3 abuts, in a flush-fit manner, that is, exactly flat, the front side of the first housing part 4*a* and at the same time is fixed by the flexible conductor 5 clamped between the two housing parts 4*a* and 4*b* and its conductor end 5*a* at the site provided in the drive housing 4. Hence a further stop of the piezo disk 3, which embraces the piezo disk 3, for example, is not required.

This edge 14 of the second housing part 4*b* exhibits a notch 14*a* in the area of the guide surfaces 9*a* and 9*b*, so that upon inserting the second housing part 4*b*, the flexible conductor 5 and its conductor end 5*a* are first guided out of the plane of the piezo disk 3 in the axial direction of the drive housing 4 or the guide channels 10 and 11 and can then also emerge from the drive housing 4 in this direction at the front side in the area of this notch 14*a*.

For the error-free and secure assembly of the drive housing 4, the two housing parts 4*a* and 4*b* exhibit at one time positioning means 15*a* and 15*b* that match one another, which make possible the insertion of the first housing part 4*a* into the second housing part 4*b* only at that location at which the guide surfaces 8*a* and 9*a* or 8*b* and 9*b* can form a guide channel 10 or 11. For this, the second housing part 4*b* exhibits a hump 15*b* as a positioning means, which runs axially on the outer casing surface 7, which abuts the groove 15*a*, shaped to match the inner casing surface of the first housing part 4a. Two diametrally disposed pairs of such positioning aids 15a and 15b are executed on the two housing parts 4a and 4b.

The flexible conductor 5 and its conductor end 5a at one time exhibit detents 12a and 12b or 13a and 13b in the area that supports the guide surfaces 8a and 8b or 9a and 9b, which are formed as extensions on both sides of the striped flexible conductor 5 or its conductor end 5a. These extensions 12a and 12b or 13a and 13b overhanging the edges of the flexible conductor 5 or its conductor end 5a with an equilateral and conical shape tapered toward the outside.

These detents 12a and 12b or 13a and 13b, what is more, serve, in the assembled state of the drive housing 4, when the flexible conductor 5 and its conductor end 5a are thus clamped in the guide channel 10 or 11 between the two housing parts 4a and 4b, to mate with the detent of the second housing part 4b constructed as an edge 14 so that, with tensile forces exerted on the flexible conductor 5 and/or its conductor end, these are not only transferred by means of their clamping between the two housing parts 4a and 4b at the drive housing 4, but also by mating of the extensions 12a and 12b or 13a and 13b at the edge 14 of the second housing part 4b.

By means of this clamping, no forces are transferred to the contact connections executed with the contact sites 3a between the piezo disk 3 and the flexible conductor 5. Tensile forces are allowed on the flexible conductor 5, but these do not act on the contact connections but only on the drive housing 4. Such tensile forces could be produced during vibrations, temperature cycling, assembly, or even by the use of electronic grouting in the area of the piezo disk 3 due to expansion and contraction of such a grout and be transferred to the flexible conductor 5.

In general, an oscillating device 1 is achieved with an assembly exhibiting a drive housing 4 with few structural parts and low assembly complexity, in which a flush and space-saving construction is ensured at the same time.

As discussed earlier in one aspect of the proposed invention a method of assembly takes place in that the drive element is inserted, with the conductor overhanging on opposite sides of the drive element, into the two grooves provided for this for part of the proposed means and the drive element is next, with the insertion of the second housing part into the first housing part, pressed into the inside of the first housing part as far as its opposite front side, thereby using this method the conductor and the conductor end are formed or shaped by adjusting to the two interoperative housing parts in the pressing process and the conductor and conductor end are clamped between the two housing parts, but the drive element, preferably the piezo disk is also fixedly positioned thereby in a flush-fit manner to the front side of the second housing part in the position provided. Further connection means for connecting the drive element to the drive housing are thus not required.

Further, it is adaptively and optionally preferred, according to a further embodiment of the invention, if the first and second housing parts with the groove or with the further optional groove are constructed in a complementary manner as aligned guide surfaces at the outer and inner casing surfaces, in which the conductor or the conductor and conductor end is or are guided by inserting the second housing part into the first housing part. As a further optional process detents on the conductor and conductor end are respectively positioned into respective dent regions or features to further secure the housing and prevent outward tension on either the conductor or conductor from reaching to the drive element connection. The danger of incorrect assembly is thus reliably prevented and the assembly is thus improved in reliability. There are thus recognized multiple methods from the proposed invention including the steps of poisoning a first housing part of a drive housing, positioning a drive element and conductor and a conductor end on the first housing part, positioning a second housing part of a drive housing thereon above the first housing part, pressing the housing parts together and receiving the conductor and conductor end in associated regions between the first and second housing and upon complete pressing together securing the drive element on a far side of the first and the second housing parts in the manner shown in FIGS. 1-6.

As will be understood by those of skill in the art the phrase hollow or bounding will be understood to represent a housing member having a bounded internal region thereof, and may be in any form, cylindrical, rectangular, square, ovoidal, or any other regular or irregular geometry that is effective to receive and operatively secure in a mating manner the conductor and conductor end and the drive element as noted herein. Nothing herein shall require that the first and second housing parts be circular in shape about a common center.

REFERENCE NUMBERS

1 Oscillating device
2 Cradle oscillator
2a Diaphragm of the cradle oscillator 2
2b Cradle-shaped oscillating body of the cradle oscillator 22
2c Surrounding edge of the diaphragm 2a
3 Drive element, piezo disk
3a Contact sites of drive element 3 with the conductor 5
4 Drive housing
4a First housing part of drive housing 4
4b Second housing part of drive housing 4
5 Conductor, flexible conductor, flexible circuit board
5a Conductor end of the conductor 5
5b Conductor channels of the conductor 5
6 Inner casing surfaces of the first housing part 4a
7 Outer casing surfaces of the second housing part 4b
8a Guide surfaces of the first housing part 4a
8b Guide surfaces of the first housing part 4a
9a Guide surfaces of the second housing part 4b
9b Guide surfaces of the second housing part 4b
10 Guide channel of the conductor 5
11 Guide channel of the conductor 5a
12a Detent of the conductor 5
12b Detent of the conductor 5
13a Detent of the conductor end 5a
13b Detent of the conductor end 5a
14 Detent of the drive housing 4, edge of the second housing part 4b
14a Notch of the edge 14
15a Positioning elements of the first housing part 4a
15b Positioning elements of the second housing part 4b
16 Shim/ceramic disk
17a Housing wall of the first housing part 4a
17b Housing wall of the second housing part 4b
18a Groove of the housing wall 17a
18b Groove of the housing wall 17a Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An oscillating device, for a fill-level measurement unit, comprising:
   a diaphragm displaceable in oscillation;
   a drive element of the diaphragm is a piezo disk operatively connected to the diaphragm by a shim and said shim constructed as a ceramic disk;
   a bounding drive housing for receiving the drive element at an open-ended front side of the bounding drive housing;
   a flexible electrical conductor operably connected to the drive element;
   the bounding drive housing including a first bounding housing part, which encloses a second bounding cylindrical housing part concentrically in a flush-fit manner, in which the second housing part, being displaced axially, is operatively insertable into the first housing part; and
   the flexible electrical conductor operably extending starting from the drive element essentially in an axial direction away from the drive element and between the first housing part and the second housing part, such that said flexible electrical conductor is clamped between an inner casing surface of the first housing part and an outer casing surface of the second housing part.

2. The oscillating device, according to claim 1, wherein:
   the conductor is connected by developing a conductor end overhanging the drive element to the drive element, and the conductor end starting from the drive element is clamped essentially in an axial direction between the first and the second housing part.

3. The oscillating device, according to claim 2, wherein:
   at the inner casing surface of the first housing part and at the outer casing surface of the second housing part, respective corresponding guide surfaces matching respectively one another provide a clamped guidance of the conductor thereby minimizing an unintended separation of said conductor and said conductor end from said drive element.

4. The oscillating device, according to claim 3, wherein:
   the guide surfaces form at least one respective guide channel for operatively receiving the conductor; and
   a bounded region of the guide channel operatively essentially matches a cross-section of the conductor.

5. The oscillating device, according to claim 4, wherein:
   at least one of the conductor and the conductor end includes a detent;
   the detent being respectively proximate the bounding drive housing; and
   the bounding drive housing includes at least one detent operatively complementary to the detent of at least one of the conductor and the conductor end.

6. The oscillating device, according to claim 5, wherein:
   an extension of said at least one of the conductor and the conductor end running in the guide surfaces is provided as the detent, such that it abuts a front edge facing away from a sensor and overhanging the outer casing surface of the second housing part as a complementary detent.

7. The oscillating device, according to claim 6, wherein:
   the first and second housing parts include matching positioning elements operative to orient the guide surfaces towards one another upon an insertion the first housing part into the second housing part.

8. The oscillating device, according to claim 1, wherein:
   the diaphragm is operatively displaceable in oscillation and is constructed as a cradle oscillator.

9. The oscillating device, according to claim 8, wherein:
   an operative connection between the drive element and the shim on the one hand and the diaphragm on the other hand is made by means of a glued connection.

10. A method for an assembly of a oscillating device, for a fill-level measurement unit, comprising the steps of:
    providing a diaphragm displaceable in oscillation;
    providing a drive element including a piezo disk;
    operatively connecting the piezo disk with the diaphragm via a shim that is constructed as a ceramic disk;
    providing a first bounding drive housing and receiving therein the drive element at an open-ended front side of the first bounding drive housing;
    providing a flexible electrical conductor and connecting the conductor to the drive element, the drive element with the conductor projecting radially at the front side of the first bounding drive housing;
    placing the conductor proximate an edge-wise groove of the first bounding drive housing, and
    providing and positioning a second bounding drive housing for insertion into the first bounding drive housing; and
    inserting the second bounding drive housing into the first bounding drive housing and shifting the drive element to an opposing side opposite an insertion side of said first bounding drive housing and clamping the flexible electrical conductor between an inner casing surface of the first bounding drive housing and an outer casing surface of the second bounding drive housing.

11. The method, according to claim 10, further comprising the step of guiding, during the step of inserting, a conductor end of the conductor into the groove essentially in an axial direction between the first and second bounding drive housing.

12. The method, according to claim 11, wherein:
    the first and second bounding drive housing are constructed with respective grooves operative as aligned guide surfaces at respective proximate outer and inner casing surfaces of each housing, and
    said respective guide surfaces guide, during said step of inserting, the conductor between and relative to the first and second bounding drive housings.

* * * * *